US007611742B2

(12) United States Patent
Calvert, Jr.

(10) Patent No.: US 7,611,742 B2
(45) Date of Patent: Nov. 3, 2009

(54) REDUCED FAT AND CARBOHYDRATE MILK PRODUCT AND PROCESS FOR MANUFACTURING SUCH MILK PRODUCT

(75) Inventor: Frederic R. Calvert, Jr., Whitehouse, TX (US)

(73) Assignee: HP Hood, LLC, Chelsea, MA (US)

( * ) Notice: Subject to any disclaimer, the term of this patent is extended or adjusted under 35 U.S.C. 154(b) by 879 days.

(21) Appl. No.: 10/753,766

(22) Filed: Jan. 8, 2004

(65) Prior Publication Data

US 2004/0208973 A1 Oct. 21, 2004

Related U.S. Application Data

(60) Provisional application No. 60/467,173, filed on May 2, 2003, provisional application No. 60/467,174, filed on May 2, 2003, provisional application No. 60/448,582, filed on Feb. 21, 2003, provisional application No. 60/448,583, filed on Feb. 21, 2003, provisional application No. 60/448,581, filed on Feb. 21, 2003, provisional application No. 60/516,751, filed on Nov. 4, 2003, provisional application No. 60/516,750, filed on Nov. 4, 2003, provisional application No. 60/516,749, filed on Nov. 4, 2003, provisional application No. 60/516,732, filed on Nov. 4, 2003, provisional application No. 60/482,718, filed on Jun. 27, 2003, provisional application No. 60/448,584, filed on Feb. 21, 2003.

(51) Int. Cl.
*A23C 9/00* (2006.01)

(52) U.S. Cl. .......................... 426/580; 426/519; 426/522; 426/585

(58) Field of Classification Search .................. 426/519, 426/520, 521, 522, 580, 585, 656, 657
See application file for complete search history.

(56) References Cited

U.S. PATENT DOCUMENTS

| | | | |
|---|---|---|---|
| 1,882,637 A | 10/1932 | Johnson et al. | |
| 2,349,227 A | 5/1944 | Thomeloe et al. | |
| 2,682,467 A | 6/1954 | Brereton et al. | |
| 2,809,113 A | 10/1957 | Stimpson et al. | |
| 2,876,104 A | 3/1959 | Bliudzius et al. | |
| 3,074,796 A | 1/1963 | Peebles et al. | |
| 3,096,177 A | 7/1963 | Ariyama | |
| 3,269,842 A | 8/1966 | Mayer et al. | |
| 3,873,751 A | 3/1975 | Arndt | |
| 3,882,256 A | 5/1975 | De Boer | |
| 4,051,269 A | 9/1977 | Strinning | |
| 4,085,228 A | 4/1978 | Reinbold et al. | |
| 4,110,476 A | 8/1978 | Rhodes | |
| 4,165,392 A | 8/1979 | Kawai et al. | |
| 4,374,861 A | 2/1983 | Trzecieski | |
| 4,401,657 A | 8/1983 | Kashiwabara et al. | |
| 4,410,549 A | 10/1983 | Baker | |
| 4,497,834 A | 2/1985 | Barta | |
| 4,511,590 A | 4/1985 | Caldwell | |
| 4,675,200 A | 6/1987 | Serpelloni et al. | |
| 4,689,245 A | 8/1987 | Kosikowski et al. | |
| 4,837,035 A | 6/1989 | Baker et al. | |
| 4,837,036 A | 6/1989 | Baker et al. | |
| 4,853,246 A | 8/1989 | Stevens | |
| 4,948,599 A | 8/1990 | Sagara et al. | |
| 4,956,186 A | 9/1990 | Streiff et al. | |
| 4,959,227 A | 9/1990 | Amer | |
| 5,064,674 A | 11/1991 | Girsh | |
| 5,128,156 A | 7/1992 | McKenna et al. | |
| 5,149,559 A | 9/1992 | Alaers et al. | |
| 5,198,351 A | 3/1993 | Somkuti et al. | |
| 5,334,399 A | 8/1994 | Flynn et al. | |
| 5,357,852 A | 10/1994 | Kohler et al. | |
| 5,447,740 A | 9/1995 | Brown | |
| 5,486,372 A | 1/1996 | Martin et al. | |
| 5,492,716 A | 2/1996 | Molochnikov et al. | |
| 5,711,982 A | 1/1998 | Takemori et al. | |

(Continued)

FOREIGN PATENT DOCUMENTS

| | | |
|---|---|---|
| EP | 0 345 226 A2 | 12/1989 |
| EP | 0 953 289 A2 | 11/1999 |
| GB | 2 066 837 A | 7/1981 |
| GB | 2 147 188 A | 5/1985 |

(Continued)

OTHER PUBLICATIONS

Fennema, O.R., Food Chemistry, 1985, Marcel Dekker, Inc., New York, $2^{nd}$ Edition, pp. 668-680.*
Nobel P. Wong, "Fundamentals Of Dairy Chemistry," Third Edition, Van Nostrand Reinhold, 1, 3-4 (1988).
E. Renner et al., "Application Of Ultrafiltration In The Dairy Industry," Elsevier Applied Science, 112, 132-133 (1991).
"2003 Best Products, New Product Company of the Year: LeCarb," Dairy Foods, 104:11, 24-26 (Nov. 2003).
"No More Blue Milk," Dairy Foods, Ingredient Technology, Buyer's Mart, 48 (Mar. 1999).

(Continued)

*Primary Examiner*—Leslie Wong
(74) *Attorney, Agent, or Firm*—Finnegan, Henderson, Farabow, Garrett & Dunner LLP

(57) ABSTRACT

A reduced carbohydrate, milk product includes ultra filtered (UF) raw skim milk, water, a fat source, and a protein source. A process for manufacturing such a milk product includes the steps of providing UF skim milk, adding water and a fat source to the UF skim milk to obtain a first combination of UF skim milk, water and a fat source; and adding a source of protein to the first combination to form a second combination. The first combination may include a desired composition of non-fat milk solids of about 5.65% by weight, total solids in a range of about 8.9% to about 10.5% by weight, and butterfat in an amount less than about 3.3% by weight.

8 Claims, No Drawings

U.S. PATENT DOCUMENTS

| | | | |
|---|---|---|---|
| 5,776,525 | A | 7/1998 | Ide et al. |
| 6,162,472 | A | 12/2000 | Griffin et al. |
| 6,384,087 | B1 | 5/2002 | Zemel et al. |
| 6,426,110 | B1 | 7/2002 | Basa |
| 6,458,409 | B1 | 10/2002 | Trouille |
| 6,569,485 | B2 | 5/2003 | Hussein |
| 6,635,302 | B1 | 10/2003 | Huang et al. |
| 6,667,068 | B2 | 12/2003 | Smith |
| 6,685,977 | B1 | 2/2004 | Asano et al. |
| 6,716,461 | B2 | 4/2004 | Miwa et al. |
| 6,720,018 | B2 | 4/2004 | Kawachi et al. |
| 2002/0102346 | A1 | 8/2002 | Stark et al. |
| 2002/0119234 | A1 | 8/2002 | Finocchiaro |
| 2002/0155198 | A1 | 10/2002 | Wang et al. |
| 2003/0031754 | A1 | 2/2003 | Lange |
| 2003/0104104 | A1 | 6/2003 | Allouche |
| 2004/0040448 | A1 | 3/2004 | Dunker et al. |
| 2004/0052860 | A1 | 3/2004 | Reid et al. |
| 2004/0208972 | A1 | 10/2004 | Calvert, Jr. |
| 2004/0208973 | A1 | 10/2004 | Calvert, Jr. |
| 2004/0208974 | A1 | 10/2004 | Calvert, Jr. |

FOREIGN PATENT DOCUMENTS

| | | |
|---|---|---|
| JP | 2-303450 A | 12/1990 |
| JP | 6-105651 A | 4/1994 |
| JP | 6-303900 A | 11/1994 |
| JP | 9-252723 A | 9/1997 |
| JP | 10-243776 * | 9/1998 |
| JP | 2000-135055 * | 5/2000 |
| JP | 2002-051699 A | 2/2002 |
| WO | WO 82/01806 | 6/1982 |
| WO | WO 90/13227 | 11/1990 |
| WO | WO 00/21391 | 4/2000 |
| WO | WO 03/051130 A2 | 6/2003 |

OTHER PUBLICATIONS

Co-pending U.S. Application No. 10/753,767 Title: Reduced Fat And Carbohydrate Cultured Dairy Product And Process For Manufacturing Such Cultured Dairy Product, Inventor(s): Frederic R. Calvert, Jr., U.S. Filing Date: Jan. 8, 2004.

International Search Report dated Aug. 19, 2004, PCT/US2004/004896 International Filing Date: Feb. 19, 2004 Applicant: Frederic R. Calvert, Jr.

Patent Abstract of Japan 02303450 A, Dec. 17, 1990.

Patent Abstract of Japan 06105651 A, Apr. 19, 1994.

Patent Abstract of Japan 06303900 A, Nov. 1, 1994.

Patent Abstract of Japan 09252723 A, Sep. 30, 1997.

Patent Abstract of Japan 2002051699 A, Feb. 19, 2002.

Nerac.com Retro Search, from FSTA—Food Science & Technology Abstracts, Dec. 1, 2003, 1-66.

Dennis Van Milligen, "Sanitation helps extend shelf life," Plant Operations, 1-5 (Mar. 2001), at http://www.dairyfoods.com/articles/2001/0301/0301plantsf.htm.

David Phillips, "Oneida plant helps meet regional and national demand for long-life products," Plant Review, 1-5, (Dec. 2001) at http://www.dairyfoods.com/articles/2001/1201/1201plant.htm.

"Low-Carb Frozen Dessert (New Product Review).(South West Dairy)(Brief Article)," (Jun. 2002), at http://www.findarticles.com/cf_dls/m3301/6_103/87469101/print.jhtml.

"Ice cream cuts carbs. (Marketwatch).(LeCarb from South West Foods)(Brief Article)," (Dec. 2002), at http://www.findarticles.com/cf_dls/m3289/12_171/95628707/print.jhtml.

"Low-carbohydrate Yogurt.(new from South West Foods)(Brief Article)," (Sep. 2003) at http://www.findarticles.com/cf_dls/m3301/9_104/108267580/print.jhtml.

"Low Carb Luxury Product Spotlight—Shakes and Beverages," (May 23, 2003).

"LeCarb: now milk taps into the Atkins tend," 1-2 (Jun. 20, 2003).

"Ice Cream Cuts Carbs," Prepared Foods 2002-2003 Source Book Market Watch (Dec. 2002), at www.preparedfoods.com/archives/2002/2002 12/1202marketwatch.html.

"Countdown to Success!," Hood Happening, (Oct. 2003).

Anderson Erickson, "AE's Low Carbohydrate Products," at www.aedairy.com/prod_lowcarb.html.

"LeCarb—Products for the Low Carb Lifestyle," at http://www.lecarb.net/.

"Frozen Dessert," at http://www.leecarb.net/products/frozendessert.

"YoCarb," at http://www.lecarb.net/products/yocarb.

"Dairy Drink," at http://www.lecarb.net/products/dairydrink.

"Carb Countdown™ Homogenized," at http://www.hphood.com/products/products.detail.asp?id=477.

"Carb Countdown™ 2% Reduced Fat," at http://www.hphood.com/products/products.detail.asp?id=478.

"Carb Countdown™ Fat Free," at http://www.hphood.com/products/products.detail.asp?id=479.

"Carb Countdown™ 2% Reduced Fat Chocolate," at http://www.hphood.com/products/products.detail.asp?id=480.

Labels for: LeCarb Dairy Drink, Chocolate; LeCarb Dairy Drink, 2% Lowfat; LeCarb Dairy Drink, Homogenized.

English language translation of JP10-243776 and certification page, Jan. 19, 2007.

English language translation of JP2000-135055 and certification page, Jan. 19, 2007.

English language translation of JP06-303900 and certification page, Jan. 19, 2007.

* cited by examiner

US 7,611,742 B2

REDUCED FAT AND CARBOHYDRATE MILK PRODUCT AND PROCESS FOR MANUFACTURING SUCH MILK PRODUCT

PRIORITY

This application claims priority from U.S. Provisional Application No. 60/467,173, entitled "REDUCED CARBOHYDRATE, MILK PRODUCT AND PROCESS FOR MANUFACTURING SUCH MILK PRODUCTS," filed May 2, 2003; U.S. Provisional Application No. 60/467,174, entitled "REDUCED FAT AND CARBOHYDRATE, MILK PRODUCT AND PROCESS FOR MANUFACTURING SUCH MILK PRODUCTS," filed May 2, 2003; U.S. Provisional Application No. 60/448,582, entitled "REDUCED FAT AND CARBOHYDRATE, MILK PRODUCT AND PROCESS FOR MANUFACTURING SUCH MILK PRODUCTS," filed Feb. 21, 2003; U.S. Provisional Application No. 60/448,583, entitled "REDUCED CARBOHYDRATE, YOGURT PRODUCT AND PROCESS FOR MANUFACTURING SUCH YOGURT PRODUCTS," filed Feb. 21, 2003; U.S. Provisional Application No. 60/448,581, entitled "REDUCED FAT AND CARBOHYDRATE, YOGURT PRODUCT AND PROCESS FOR MANUFACTURING SUCH YOGURT PRODUCTS," filed Feb. 21, 2003, all of which are hereby incorporated herein by reference, and the present application further claims priority from U.S. Provisional Application No. 60/516,751, entitled "REDUCED FAT AND CARBOHYDRATE, MILK PRODUCT AND PROCESS FOR MANUFACTURING SUCH MILK PRODUCTS," filed Nov. 4, 2003; U.S. Provisional Application No. 60/516,750, entitled "REDUCED FAT AND CARBOHYDRATE, CULTURED DAIRY PRODUCTS AND PROCESSES FOR MANUFACTURING SUCH CULTURED DAIRY PRODUCTS," filed Nov. 4, 2003; U.S. Provisional Application No. 60/516,749, entitled "REDUCED CARBOHYDRATE, MILK PRODUCT AND PROCESS FOR MANUFACTURING SUCH MILK PRODUCTS," filed Nov. 4, 2003; U.S. Provisional Application No. 60/516,732, entitled "REDUCED CARBOHYDRATE, CULTURED DAIRY PRODUCTS AND PROCESSES FOR MANUFACTURING SUCH CULTURED DAIRY PRODUCTS," filed Nov. 4, 2003; U.S. Provisional Application No. 60/482,718, entitled "REDUCED FAT AND CARBOHYDRATE, CULTURED DAIRY PRODUCTS AND PROCESSES FOR MANUFACTURING SUCH CULTURED DAIRY PRODUCTS," filed Jun. 27, 2003; and U.S. Provisional Application No. 60/448,584, entitled "REDUCED CARBOHYDRATE, MILK PRODUCT AND PROCESS FOR MANUFACTURING SUCH MILK PRODUCTS," filed Feb. 21, 2003.

CROSS-REFERENCE TO RELATED APPLICATIONS

This application is related to concurrently filed, co-pending and commonly assigned U.S. patent application Ser. No. 10/753,763, entitled "REDUCED CARBOHYDRATE MILK PRODUCT AND PROCESS FOR MANUFACTURING SUCH MILK PRODUCT;" U.S. patent application Ser. No. 10/753,769, entitled "REDUCED CARBOHYDRATE CULTURED DAIRY PRODUCT AND PROCESS FOR MANUFACTURING SUCH CULTURED DAIRY PRODUCT;" and U.S. patent application Ser. No. 10/753,767, entitled "REDUCED FAT AND CARBOHYDRATE CULTURED DAIRY PRODUCT AND PROCESS FOR MANUFACTURING SUCH CULTURED DAIRY PRODUCT," the disclosures of which are hereby incorporated herein by reference.

FIELD OF THE INVENTION

The invention relates generally to reduced or low fat and carbohydrate, milk products and processes for manufacturing such products. More specifically, the invention relates to reduced or low fat and carbohydrate milk products, e.g., products which contain fewer carbohydrates than similar quantities of milk or food associated with milk of otherwise similar nutritional value, comprising ultra filtered raw skim milk, water, a fat source, and a protein source and processes for combining these components to manufacture such milk products.

DESCRIPTION OF RELATED ART

Carbohydrates are a primary source of immediate energy for humans. Carbohydrates may be consumed in the form of sugars, starches, or cellulose. During the digestive process, carbohydrates, with the exception of dietary fiber, initially are converted into glucose. The human body may use such glucose in at least three ways. First, glucose may be absorbed directly into the blood stream and delivered to the body's muscles for immediate use. Second, if there is no immediate need for the glucose, it may be stored for later use in the body's muscles in the form of glycogen. Third, if there is no immediate need for the glucose and there is too much glucose or insufficient storage capacity in the body's muscles, the body converts the excess glucose into fat and stores this converted glucose within the body's fat cells. See www.all-healthy.com/content/pod/carbohydrate.aspx.

It is this last use for glucose which helps explain the increased popularity of reduced or low carbohydrate diets. Humans consume three basic sources of energy: fat, carbohydrates, and protein to obtain the calories (energy) necessary to fuel their muscles. Fat provides about nine (9) calories per gram; protein provides about four (4) calories per gram; and carbohydrates also provide about four (4) calories per gram. Id. Diets high in fat, e.g., diets which provide more fat than that which is converted to energy by the consumer or than a daily recommended consumption, or both, have been associated with weight and other health problems in humans. In particular, high fat diets have been connected with cardiovascular disease. Further, weight problems associated with high fat diets have been associated with a higher incidence of adult onset or type-II diabetes. See www.all-healthy.com/content/pod/diabetes.aspx. Consequently, for many years, doctors and dieticians have promoted the benefits of reduced or low fat diets, e.g., diets which provide less fat than that which is converted to energy by the consumer or than a daily recommended consumption, or both. Generally, the goal of these diets is to encourage the conversion of existing stored fat into energy while at the same time reducing the body's intake of new fat.

In recent years, however, the theory behind such reduced or low fat diets has been called into question. Because a gram of fat supplies a proportionally greater percentage of calories to the body, when compared with a gram of protein or carbohydrates, a reduction in one (1) gram of fat consumed has more than twice the impact of a one gram reduction in the consumption of proteins or carbohydrates. Thus, a person consuming a reduced or low fat diet may force his or her body to consume both fat and muscle tissue to make up the body's fuel deficiency. Loss of lean muscle tissue, however, may slow the body's metabolic rate and actually may reduce the body's efficiency in breaking down fat. Alternatively, the dieter may be tempted to increase his or her consumption of proteins or carbohydrates, or both, to replace the calories lost due to the reduced consumption of fat. As noted above, however, persons must consume twice the weight of proteins or carbohydrates, or both, in order to obtain the calories lost through the reduced consumption of fat. If the dieter increases his or her carbohydrate intake to offset the loss of calories caused by the reduced consumption of fat, the body produces an increased supply of glucose. Generally, the body will not breakdown stored fat for fuel when an abundant supply of sugars is available.

Diets combining reduced fat intake, reduced carbohydrate intake, and a moderate intake of protein, e.g., at or about a recommended daily consumption, have been promoted as an alternative to such reduced or low fat diets. As noted above, without sugars from carbohydrates, the human body may be forced to turn to stored fat as a source of energy. If carbohydrate intake is regulated, the body's production of insulin, which facilitates the use of glucose in muscles and the conversion of excess glucose into fat, may be stabilized. Swings in blood sugar levels resulting from unregulated carbohydrate consumption may result in cravings and hunger pangs. When insulin levels are stable, blood sugar levels remain more stable, and the likelihood of cravings and hunger pangs decreases.

Milk and foods containing or consumed with milk, such as breakfast cereals, are important sources of fat, carbohydrates, and proteins in many diets. Milk and foods associated with milk, e.g., cheese, also are important sources of essential nutrients, including vitamins, such as Vitamin D, and minerals, such as calcium. Whole milk contains about 12 gms of carbohydrates per 236.6 $cm^3$ (8 fluid ounces) serving, about 8 gms of protein per 236.6 $cm^3$ serving, and about 8 gms of fat per 236.6 $cm^3$ serving. Whole milk also provides about 240 mg of calcium or 30% of the U.S. Recommended Daily Allowance (RDA) of calcium, about 300 IU of Vitamin A or 6% of the U.S. Recommended Daily Allowance (RDA) of Vitamin A, and 100IU of Vitamin D or 25% of the U.S. Recommended Daily Allowance (RDA) of Vitamin D per 236.6 $cm^3$ serving. Thus, while milk and foods associated with milk may provide one and a half times as many carbohydrates per serving, as fat or protein, such high carbohydrate content may make milk and foods associated with milk inappropriate in a reduced or low carbohydrate diet.

In reduced or low fat diets, 30% or less of daily calorie intake is derived from fat. Dietary fat may comprise both saturated and unsaturated fatty acids, and saturated fats have been associated with elevated levels of blood cholesterol. Consumption of diets high in saturated fats, especially by persons having elevated blood cholesterol levels, has been associated with obesity and increased risk of cardiovascular disease and of some cancers. Generally, milk and products prepared from milk, such as cheese, are relatively high in fat, and in particular such foods are relatively high in saturated fatty acids. Milk and products made from milk are significant parts of many daily diets, and one way of reducing fat intake is to consume low or reduced fat milk or products made from milk.

In addition, almost all of the carbohydrates in whole milk are derived from lactose. Most humans possess lactase, an enzyme that catalyzes the hydrolysis of lactose into glucose and galactose, in their small intestine. However, according to the National Digestive Diseases Information Clearinghouse, between 30 and 50 million Americans lack this enzyme and are unable to digest significant amounts of lactose. Such lactose intolerance may more widely effect certain ethnic and racial populations. By some estimates, 75% of all African Americans and American Indians and 90% of all Asian Americans suffer some degree of lactose intolerance. See www.niddk.nih.gov/health/digest/pubs/lactose/lactose.htm. This intolerance may result in the necessary exclusion of milk and other foods associated with milk entirely from some diets.

SUMMARY OF THE INVENTION

A need has arisen for a milk product that has reduced or low fat and carbohydrate content. It is an advantage of such milk products that they possess a reduced or low lactose content, e.g., less lactose than in similar quantities of milk or food associated with milk of otherwise similar nutritional value. It is a feature of such milk products that their carbohydrate content is in a range of about 0.0152 $gms/cm^3$ to about 0.0254 $gms/cm^3$. It is yet a further feature of such milk products that their lactose content is in a range of about 0.0152 $gms/cm^3$ to about 0.0254 $gms/cm^3$. It is still another feature of such milk products that their fat content is less than about 0.0338 $gms/cm^3$.

Another need has arisen for a milk product that has good organoleptic qualities and good mouthfeel. It is an advantage of the milk product that avoids the bland taste or a rough or chalky mouthfeel, or both, of some other reconstituted or reduced lactose content, milk products. It is a feature of the milk product that its organoleptic qualities and mouthfeel are similar to or substantially the same as those of reduced or low fat milk.

Still another need has arisen for a milk product that has a heat stability during pasteurization and a sufficient shelf life. It is an advantage of the milk product that it may be pasteurized by a Low Temperature Long Time (LTLT) pasteurization process. It is a feature of a milk product pasteurized by LTLT pasteurization processes that it has an extended shelf-life. It is another advantage of the milk product that it may be pasteurized by a High Temperature Short Time (HTST) pasteurization process. It is a feature of a milk product pasteurized by HTST pasteurization processes that it has a shelf-life of up to about eighteen (18) days. It is a further advantage of the milk product that it may be pasteurized by an Ultra High Temperature (UHT) pasteurization process. It is a feature of a milk product pasteurized by UHT pasteurization processes that it has a shelf-life of up to about sixty (60) days.

In an embodiment of the invention, a reduced fat and carbohydrate, milk product is manufactured from ultra filtered (UF) raw skim milk. This milk product comprises carbohydrates in a range of about 0.0152 $gms/cm^3$ to about 0.0254 $gms/cm^3$; protein in a range of about 0.0338 $gms/cm^3$ to about 0.0676 $gms/cm^3$; and fat in an amount less than about 0.0338 $gms/cm^3$. The milk product further may comprise about 300 IU of Vitamin A and about 100 IU of Vitamin D.

In another embodiment of the invention, a reduced fat and carbohydrate, milk product is manufactured from UF skim milk. This milk product comprises a source of flavoring, such as chocolate flavoring, vanilla flavoring, strawberry flavoring, and the like; carbohydrates in a range of about 0.0211 $gms/cm^3$ to about 0.0338 $gms/cm^3$; protein in a range of about 0.0338 $gms/cm^3$ to about 0.0676 $gms/cm^3$; and fat in an amount less than about 0.0338 $gms/cm^3$.

In still another embodiment of the invention, a reduced fat and carbohydrate, milk comprises UF skim milk, water, a fat source, and a protein source. This milk product may further comprise carbohydrates in a range of about 0.0152 $gms/cm^3$ to about 0.0254 gms/cm$^3$; protein in a range of about 0.0338 gms/cm$^3$ to about 0.0676 gms/cm$^3$; and fat in an amount less than about 0.0338 gms/cm$^3$.

In yet another embodiment of the invention, a reduced carbohydrate, milk product comprises UF skim milk; water, a fat source, and a protein source. The milk product also comprises lactose in a range of about 0.0152 gms/cm$^3$ to about 0.0254 gms/cm$^3$; butterfat in an amount less than about 3.3% (and preferably, in a range of about 1.8% to about 2%) by weight; and non-fat milk solids in a range of about 4.5% to about 6.4%.

In a further embodiment, the invention is a process for manufacturing a milk product. The process comprises the steps of providing UF skim milk; adding water and a fat source to the UF skim milk to obtain a, first combination of UF skim milk, water and a fat source; and adding a source of protein to the first combination to form a second combination. The first combination may comprise a desired composition of non-fat milk solids of about 5.65% by weight, total solids in a range of about 8.9% to about 10.5% by weight, and butterfat in an amount less than about 3.3% (and preferably, in a range of about 1.8% to about 2%) by weight.

In still a further embodiment of the invention, a milk product comprises a first combination comprising UF skim milk, a fat source, and water; a protein source in a range of about 1% to about 2% by weight; a sweetener; a preservative; and a stabilizer. The first combination may comprise a desired composition of non-fat, milk solids (MSNF) of about 5.65% by weight, total solids in a range of about 8.9% to about 10.5% by weight, and butterfat in an amount less than about 3.3% (and preferably, in a range of about 1.8% to about 2%) by weight.

In yet a further embodiment of the invention, a milk product comprises a first combination comprising UF skim milk, a fat source, and water, wherein the first combination comprises a desired composition of non-fat, milk solids of about 5.65% by weight, total solids in a range of about 8.9% to about 10.5% by weight, and butterfat in an amount less than about 3.3% (and preferably, in a range of about 1.8% to about 2%) by weight. The milk product also comprises a protein source, wherein the protein source comprises whey protein concentrate-80 in a range of about 0.5% to about 1% by weight and calcium caseinate in a range of about 0.5% to about 1% by weight; potassium sorbate in an amount of about 0.02% by weight; a predetermined amount of sucralose; and a predetermined amount of carrageenan.

Other objects, features, and advantages will be apparent, to those skilled in the art in view of the following description of the preferred embodiments.

DETAILED DESCRIPTION OF PREFERRED EMBODIMENTS

In a preferred embodiment, a reduced fat and carbohydrate, milk product, which is manufactured from UF skim milk, may comprise carbohydrates in a range of about 0.0152 gms/cm$^3$ to about 0.0254 gms/cm$^3$; protein in a range of about 0.0338 gms/cm$^3$ to about 0.0676 gms/cm$^3$; and fat in an amount less than about 0.0338 gms/cm$^3$. Preferably, the fat amount is less than or equal to about 0.0199 gms/cm$^3$, in another preferred embodiment, the fat amount is about 0.0190 gms/cm$^3$, and in still another preferred embodiment, the fat amount is less than or equal to abut 0.0021 gms/cm$^3$. Suitable UF skim milk is available from Select Milk Products, Inc. of Artesia, N. Mex., USA.

Ultrafiltration of milk employs a membrane separation process. A pressure gradient drives milk through the membrane and the membrane fractionates components of the milk as a function of the component's solvated size and structure. In UF processes, the membrane size is relatively larger allowing larger and more components to pass through the pores with the water. This combined separation and fractionation process uses a 10,000 molecular weight (MW) cutoff, about 276 kPa, and temperatures in a range of about 50° C. to about 60° C. with polysulfone membranes. In UF skim milk, lactose and minerals pass through the membrane in a 50% separation ration. For example, the retentate, i.e., the portion of the milk which does not permeate the filter, may include 100% of the butterfat, 100% of the milk protein, 50% of the lactose, and 50% of the free minerals (including calcium). See wvw.dairyconsultant.co.uk/pages/Filtration.htm.

The UF skim milk included in the milk products and used in the processes described herein may comprise lactose in a range of about 4% to about 5.5% by weight, butter fat in a range of about 0.4% to about 1.5% by weight, protein in a range of about 9% to about 11.5% by weight, and total solids in a range of about 16% to about 19% by weight. Suitable UF skim milk has a density in a range of about 1.0545 gms/cm$^3$ to about 1.0665 gms/cm$^3$.

In this milk product, a source of the carbohydrates is lactose. Moreover, substantially all of the carbohydrate composition of the milk product may be lactose. Specifically, the lactose may be in a range of about 0.0152 gms/cm$^3$ to about 0.0169 gms/cm$^3$, and more specifically, the lactose may be about 0.0169 gms/cm$^3$. Further, the protein may be in a range of about 0.0338 gms/cm$^3$ to about 0.0507 gms/cm$^3$, and the fat may be less than about 0.0338 gms/cm$^3$.

Whole milk provides about 30% of the U.S. Recommended Daily Allowance of calcium (i.e., 800 mgs) for adult men and women. The milk product of the present invention may provide calcium in an amount greater than or equal to about 1.0144 mgs/cm$^3$.

The milk product further may comprise a stabilizer. Stabilizers may be added to control sedimentation and to improve the overall appearance and viscosity of the milk product. Stabilizers that may be used alone or in combination include an edible hydrophilic colloids (i.e., starches, including pregelatinized starches and chemically modified starches), a natural or synthetic gum, or a chemically modified polysaccharide. Suitable stabilizers include acacia, agar, algin, carrageenan, Polysorbate 80, lecithin, tapioca, gelatin, gum arabic, gum ghatti, gum karaya, gum tragacanth, guar gum, locust bean gum, xanthan gum, sodium alginate, and cellulose gums (e.g., methyl cellulose, hydroxy ethyl cellulose, hydroxypropyl cellulose, hydroxypropyl methylcellulose, and carboxymethylcellulose, and combinations thereof). In a further preferred embodiment, the stabilizer is selected from the group consisting of carrageenan, polysorbate 80, tapioca, modified food starch, lecithin, and combinations thereof. Carrageenan is preferred, however, because it is an effective stabilizer in small amounts by weight. Carrageenan may be standardized through the addition of sugar and may be obtained as Satiagel AMP 270 carrageenan from Degussa Texturant Systems France SAS, Boulogue-Billancourt Cedex-France. Another stabilizer is a calcium fortified, ice cream stabilizer (CC-323), which is available from Continental Custom Ingredients, Inc. of West Chicago, Ill., and comprises tricalcium phosphate and calcium lactate, which is standardized with dextrose. This allows the manufacturer to add fewer carbohydrates to the finished product. Whatever stabilizer is selected, preferably, it may be used in small amounts by weight, and if a starch is used, preferably, it may be used in effective amounts which will not significantly effect the carbohydrate content of the milk product.

Because the lactose content of the UF skim milk, and consequently, the lactose content of the milk product, is reduced or low in comparison to that of skim milk, it may be desirable to add a sweetener to the milk product to improve its organoleptic properties. In particular, in a preferred embodiment, the milk product has organoleptic properties similar to or substantially the same as those of whole milk. It is further preferred that the sweetener add no or no significant additional carbohydrate content to the milk product; that the sweetener is heat stable and able to withstand pasteurization temperatures or cooking temperatures, or both, without significant degradation or breakdown; and that the sweetener possess a clean flavor and not exhibit significant bitter or other aftertastes. Sucralose, which is available as Splenda® sweetener from McNeil-PPC, Inc. of Milltown, N.J. USA, is a suitable sweetener. Sucralose is preferred because of its clean flavor and its heat stable characteristic. Acesulfame-potassium also may be a suitable sweetener when used in combination with another sweetener which masks the somewhat bitter aftertaste of the acesulfame-potassium.

The milk product further may comprise a preservative to extend the shelf-life of the milk product. Preferred preservatives add no or no significant off flavors to the milk product. Suitable preservative may be selected from the group consisting of potassium sorbate, sodium benzoate, and combinations thereof. Nevertheless, potassium sorbate is preferred over sodium benzoate because potassium sorbate adds less off flavor to the milk product.

Regardless of the addition of preservatives, the milk product is preferably pasteurized. The shelf life of whole milk varies with pasteurization process. For example, if an HTST pasteurization process is used, whole milk may have a commercial shelf-life of about 14-18 days. If, however, UHT pasteurization process is used, whole milk may have a commercial shelf-life of about 50-60 days. Given the use of the same pasteurization process, the milk product may achieve a similar or substantially the same shelf-life as that of whole milk.

The milk product may be pasteurized by one of at least three (3) known pasteurization processes. In an LTLT pasteurization process, the milk product may be heated to a temperature of at least about 62.7° C. and to maintain that temperature for not less than thirty (30) minutes. An LTLT pasteurization system may comprise a vat, e.g., an open vat, in which a quantity of milk product is heated to about 62.7° C. and held at that temperature for at least about thirty (30) minutes. The milk product then is rapidly chilled to less than about 5° C., and preferably, to less than about 4.44° C. Alternatively, the milk product may be placed in sealed containers, LTLT pasteurized in shallow vats, and then cooled by a cool, flowing-water bath. In an example of an HTST pasteurization process, the milk product is heated to a temperature of not less than about 72° C. and maintained at that temperature for not less than between about fifteen (15) and sixteen (16) seconds. The milk product then is rapidly chilled to less than about 5° C., and preferably, to less than about 4.44° C. An HTST pasteurization system may comprise a plate-frame heat exchanger, a holding tube, a flow diversion valve for removing milk product from the system, and time-temperature recording means. Such systems are designed to perform continuous pasteurization operations. A milk product passing through an HTST pasteurization is preheated in a heat recovery portion of the system. The "hold tube" is the tubing in the system that transports the milk product after the point at which the milk product is preheated to about 72° C. The tubing is sized, such that passage of the milk product through the system takes between about 15 and about 20 seconds.

When the milk product reaches the end of the hold tube, if the temperature is at about 72° C. (or hotter), the milk product is deemed pasteurized. The temperature of the milk product then is lowered in a heat recovery portion of the system. The milk product then may be cooled and transferred to storage. HTST systems also may comprise such additional equipment as a vacuum chamber to remove volatile off flavors from the pasteurized milk product, and a homogenizer.

In an example of a UHT pasteurization process, the milk product is heated to about 141° C. for a period of about one (1) to two (2) seconds, and preferably, to within a range of about 141° C. for about 142° C. for a period of about two (2) to three (3) seconds. Once again, the milk product then is rapidly chilled to less than about 5° C., and preferably, to less than about 4.44° C. If the milk product is pasteurized by a UHT pasteurization process, preservatives need not be added to the milk product.

UHT pasteurization processes may be accomplished by one of two basic methods: (1) direct heating and (2) indirect heating. In direct heating methods, the milk product comes into direct contact with potable, culinary quality steam. An advantage of this UHT method is that the milk product's temperature may be quickly elevated and thus the milk product may be maintained at the pasteurization temperature for a shorter period of time. When pasteurizing a heat sensitive product, such as milk or milk products, the shorter period during which the milk product's temperature is elevated the lower the likelihood that heat damage will occur. Pasteurization and sterilization of milk products are discussed in detail in Chapters 5 and 6 of Michael Lewis and Niel Heppell, *Continuous Thermal Processing of Foods, Pasteurization and UHT Sterilization* (Aspen Publishers, Inc. 2000), which is incorporated herein by reference.

Direct heating may be accomplished by one of at least two methods: (1) injection heating and (2) infusion heating. In injection heating, the milk product is pre-heated, and the steam then is injected directly into the pre-heated, milk product. By pre-heating the milk product, scalding may be reduced or avoided. Steam injection causes the milk product temperature to rise rapidly, and after a predetermined holding period, the milk product is flash cooled in a vacuum to remove an amount of water equivalent to that added by the condensing steam. Injection heating may have cost disadvantages because significant amounts of energy are expended in producing the steam and cooling the milk product. Further, because of the high temperatures involved and the direct contact between the milk product and the steam and steam heated equipment, the milk product flavor may be adversely affected.

In infusion heating, the milk product is pumped into a chamber filled with high pressure steam, in which the milk may form a free falling film. The chamber is sized and the flow of milk product is controlled, such that the fall time corresponds to a predetermined holding time. Because the bottom of the chamber is relatively cool, the heated milk product film falls onto and collects on a relatively cool surface, from which the milk product may be removed for flash cooling in a vacuum to remove an amount of water equivalent to that added by the condensing steam. Infusion heating has several advantages over injection heating, including rapid heating and rapid cooling of the milk product, more uniform heating and the elimination or reduction of hot spots, and greater suitability for lower and higher viscosity products.

Indirect heating may be accomplished using a variety of heat exchanger systems, such as Plate Heat Exchanger Systems, Tubular Heat Exchanger Systems, Scraped Surface Heat Exchangers, and Double-Cone Heat Exchangers. Plate and Tubular Heat Exchanger Systems generally are more suitable for milk or milk products. In a Plate Heat Exchanger System, the milk product may be applied to a heated plate in order to heat the milk product. A pattern may be formed on the plate in order to increase the turbulence of the milk contacting the plate surface. Because milk and products are heat labile substances, sterilization of milk in Plate Heat Exchanger Systems may result in the eventual fouling of the plate surface. Although more frequent cleaning may be required, such systems allow for improved temperature control, are of relatively simple configuration, and allow for relatively high throughput. Tubular Heat Exchanger Systems may occur in various configurations, including tube in shell, coil in shell, double tube, and triple tube. The common feature of each of these configurations is that either the heating medium or the milk product may flow in a tube, a coil, or a tube within a tube, so that it may supply heat to a milk product while remaining physically isolated from the milk product or so that it may receive heat from a heating medium while remaining physically isolated from the heating medium. Scraped Surface Heat Exchangers and Double-Cone Heat Exchangers generally are used for more viscous products and products containing particulates.

In another preferred embodiment, a reduced fat and carbohydrate, milk product, which is manufactured from UF skim milk, comprises a source of flavoring; carbohydrates in a range of about 0.0211 gms/cm$^3$ to about 0.0338 gms/cm$^3$; protein in a range of about 0.0338 gms/cm$^3$ to about 0.0676 gms/cm$^3$; and fat in an amount less than about 0.0338 gms/cm$^3$. As with the embodiment described above, a source of the carbohydrates in this milk product is lactose. Moreover, substantially all of the carbohydrate composition of the milk product may be lactose. Specifically, the lactose may be in a range of about 0.0152 gms/cm$^3$ to about 0.0169 gms/cm$^3$, and more specifically, the lactose may be about 0.0169 gms/cm$^3$. Further, the protein may be in a range of about 0.0338 gms/cm$^3$ to about 0.0507 gms/cm$^3$, and the fat may be about 0.0190 gms/cm$^3$.

The source of flavoring may be selected from the group consisting of chocolate flavoring, vanilla flavoring, and strawberry flavoring. Chocolate flavoring may comprise natural or artificial chocolate or cocoa powder (e.g., Hershey's powdered cocoa, which is available from the Hershey Foods Corporation of Hershey, Pa., USA), chocolate syrup, or combinations thereof. Vanilla flavoring may comprise natural or artificial vanilla powder, vanilla extract, vanilla syrup, or combinations thereof. Strawberry flavoring may comprise natural or artificial strawberry syrup. Other sources of flavoring also may be used; however, total carbohydrates for milk products comprising other sources of flavoring preferably shall remain within the range of about 0.0211 gms/cm$^3$ to about 0.0338 gms/cm$^3$.

In still another preferred embodiment, a reduced carbohydrate, milk product comprises UF skim milk, water, a fat source, and a protein source. This milk product further may comprise carbohydrates in a range of about 0.0152 gms/cm$^3$ to about 0.0254 gms/cm$^3$; protein in a range of about 0.0338 gms/cm$^3$ to about 0.0676 gms/cm$^3$; and fat in an amount less than or equal to about 0.0199 gms/cm$^3$.

As in the foregoing embodiments, a source of the carbohydrates in this milk product is lactose. Moreover, substantially all of the carbohydrate composition of the milk product may be lactose. Specifically, the lactose may be in a range of about 0.0152 gms/cm$^3$ to about 0.0169 gms/cm$^3$, and more specifically, the lactose may be about 0.0169 gms/cm$^3$. Further, the protein may be in a range of about 0.0338 gms/cm$^3$ to about 0.0507 gms/cm$^3$, and the fat may be about 0.0199 gms/cm$^3$.

The milk product of the present embodiment of the invention may provide calcium in an amount greater than or equal to about 1.0144 mgs/cm$^3$.

The fat source may be cream. Forty percent (40%) butterfat cream comprises about 2.78% carbohydrates, about 1.98% protein, and about 40% fat by weight. Substantially all of the carbohydrates in cream are in the form of lactose. Although other sources of fat may be used, cream is preferred for several reasons. Specifically, UF skim milk has a lower calcium content than whole milk, and the inclusion of cream in the milk product also replaces some of the calcium removed during the ultrafiltration process. Moreover, the addition of cream in the milk product improves certain organoleptic characteristics of the milk product, and in particular, the inclusion of cream contributes to a mouthfeel of the milk product more closely approaching that of whole milk. If a fat source with a lower fat content is included in the milk product, the fat content of the milk product may be reduced, and a milk product which has low or reduced fat content, as well as low or reduced carbohydrate content, in comparison to whole milk may be obtained.

The protein source is preferably neutral in flavor and low in carbohydrate content. Suitable protein sources for inclusion in this embodiment may be selected from the group consisting of egg white solids, whey protein concentrate-80, milk protein concentrate, soy protein, calcium caseinate, and combinations thereof. Calcium caseinate may increase total solids in the milk product and may improve mouthfeel. Preferably, however, the protein source is calcium caseinate or whey protein concentrate-80, or a combination thereof. These sources do not have a significant negative impact on the flavor of the milk product, and each alone and both in combination have low or reduced carbohydrate content relative to the other protein sources. Moreover, the addition of calcium caseinate or whey protein concentrate-80, or a combination thereof in the milk product improves certain organoleptic characteristics of the milk product, and in particular, the inclusion of calcium caseinate or whey protein concentrate-80, or a combination thereof contributes to a mouthfeel of the milk product more closely approaching that of reduced or low fat milk.

As with the embodiments described above, this milk product also may comprise a stabilizer, a sweetener, a preservative, or combinations thereof. The considerations described above with respect to the selection and inclusion of these additional milk product components apply to this embodiment as well. Moreover, regardless of the addition of preservatives, the milk product preferably is pasteurized. Once again, the milk product may be pasteurized by one of the pasteurization processes described above. Further, as noted above, if the milk product is pasteurized by a UHT pasteurization process, preservatives need not be added to the milk product.

In a modification of the foregoing embodiment, the milk product further comprises a source of flavoring and carbohydrates in a range of about 0.0211 gms/cm$^3$ to about 0.0338 gms/cm$^3$; protein in a range of about 0.0338 gms/cm$^3$ to about 0.0676 gms/cm$^3$; and fat in an amount less than about 0.0338 gms/cm$^3$. As with the embodiments described above, a source of the carbohydrates in this milk product is lactose. Moreover, substantially all of the carbohydrate composition of the milk product may be lactose. Specifically, the lactose may be in a range of about 0.0152 gms/cm$^3$ to about 0.0169 gms/cm$^3$, and more specifically, the lactose may be about 0.0169 gms/cm$^3$.

Further, the protein may be in a range of about 0.0338 gms/cm$^3$ to about 0.0507 gms/cm$^3$, and the fat may be about 0.0199 gms/cm$^3$.

In a further modification of this embodiment, the fat amount may be less than or equal to about 0.0021 gms/cm$^3$. The source of flavoring again may be selected from the group consisting of chocolate flavoring, vanilla flavoring, and strawberry flavoring. Chocolate flavoring may comprise natural or artificial chocolate or cocoa powder, chocolate syrup, or combinations thereof. Vanilla flavoring may comprise natural or artificial vanilla powder, vanilla extract, vanilla syrup, or combinations thereof. Strawberry flavoring may comprise natural or artificial strawberry syrup. Other sources of flavoring also may be used; however, total carbohydrates for milk products comprising other sources of flavoring preferably shall remain within the range of about 0.0211 gms/cm$^3$ to about 0.0338 gms/cm$^3$.

In yet another preferred embodiment, a reduced carbohydrate, milk product may comprise UF skim milk; water, a fat source, and a protein source and further comprising lactose in a range of about 0.0152 gms/cm$^3$ to about 0.0254 gms/cm$^3$; butterfat in an amount less than about 3.3% (and preferably, in a range of about 1.8% to about 2%) by weight; and non-fat milk solids in a range of about 4.5% to about 6.4%. This embodiment further may comprise a source of flavoring, such as those described above.

In still yet another embodiment, the milk product comprises a first combination comprising UF skim milk, a fat source, and water; a protein source in a range of about 1% to about 2% by weight; a sweetener; a preservative and a stabilizer. In this milk product, the first combination may comprise a desired composition of non-fat milk solids of about 5.65% by weight, total solids in a range of about 8.9% to about 10.5% by weight, and butterfat in an amount less than about 3.3% (and preferably, in a range of about 1.8% to about 2%) by weight.

The protein source for this embodiment preferably comprises whey protein concentrate-80 in a range of about 0.5% to about 1% by weight and calcium caseinate in a range of about 0.5% to about 1% by weight. Further, the fat source again may be cream. As noted above, the selection of either of these components for the respective protein and fat source in this embodiment of the milk product contributes to improved organoleptic characteristics of the milk product. In particular, each component, alone or in combination, contributes to a mouthfeel of the milk product more closely approaching that of whole milk.

As with the embodiments described above, this milk product also may comprise a stabilizer, a sweetener, a preservative, or combinations thereof. In particular, the milk product may comprise carrageenan as a stabilizer, sucralose as a sweetener, and a preservative selected from the group consisting of potassium sorbate, sodium benzoate, and combinations thereof. The considerations described above with respect to the selection and inclusion of these additional milk product components apply to this embodiment as well. Moreover, regardless of the addition of preservatives, the milk product preferably is pasteurized. Once again, the milk product may be pasteurized by any of the pasteurization processes described above. Further, as noted above, if the milk product is pasteurized by a HTST or UHT pasteurization process, preservatives need not be added to the milk product.

In a further embodiment, a milk product comprises a first combination comprising UF skim milk, a fat source, and water; a protein source; potassium sorbate as a preservative, a predetermined amount of sucralose, and a predetermined amount of carrageenan. The first combination comprises a desired composition of non-fat milk solids of about 5.65% by weight, total solids in a range of about 8.9% to about 10.5% by weight, and butterfat in an amount less than about 3.3% (and preferably, in a range of about 1.8% to about 2%) by weight. Further, the protein source comprises whey protein concentrate-80 in a range of about 0.5% to about 1% by weight and calcium caseinate in a range of about 0.5% to about 1% by weight.

In still yet a further embodiment, the invention is a process for manufacturing a milk product, such as those described above, and milk products manufactured by such processes. The process may comprise the steps of providing UF skim milk; adding water and a fat source to the UF skim milk to obtain a first combination of UF skim milk, water and a fat source; and adding a source of protein to the first combination to form a second combination. In this process, the first combination may comprise a desired composition of non-fat, milk solids of about 5.65% by weight, total solids in a range of about 8.9% to about 10.5% by weight, and butterfat in an amount less than about 3.3% (and preferably, in a range of about 1.8% to about 2%) by weight. The process further may comprise the steps of determining a first content of non-fat, milk solids by weight, a second content of total solids by weight, and a third content of butter fat by weight of the ultra filtered raw skim milk and determining a first amount of water and a second amount of a fat source to add to the UF skim milk to obtain the desired composition of the first combination.

As noted above, the milk product may comprise a sweetener added to improve the milk products organoleptic properties. Thus, the process further may comprise the step of adding a predetermined amount of a sweetener to the first combination to form a second combination.

Moreover, the process further may comprise the step of determining the content of the second combination, homogenizing the second combination, pasteurizing the second combination, or combinations thereof. If the process comprises the step of pasteurizing the second combination, the pasteurization process may be an LTLT pasteurization process, an HTST pasteurization process, or a UHT pasteurization process.

The invention will be further clarified by a consideration of the following examples, which are intended to be purely exemplary of the product or processes, or both, of the invention.

EXAMPLES

Example 1

The amounts of UF skim milk, cream, and water used to formulate the milk product initially may vary between batches because test results for non-fat, milk solids, butterfat, and total solids for UF skim milk and cream may vary. Nevertheless, each batch may be standardized to the following content values: non-fat, milk solids of about 5.65% (excluding whey protein concentrate-80), butterfat in a range of about 1.8% to about 2%, and total solids in a range of about 8.9% to about 10.5%, by weight. The finished milk product has a target density of about 1.0257 gms/cm$^3$.

Consequently, an example of batching for an unflavored milk product is as follows:

| Component | Percentage by Weight |
|---|---|
| UF skim Milk | (Amount standardized for MSNF, butterfat, and total solids described above) |
| Cream | |
| Water | |
| Whey Protein Concentrate-80 | 0.75% |
| Calcium Caseinate | 0.75% |
| Sucralose | 0.00584% |
| Potassium Sorbate | 0.02% |
| Carrageenan | 0.02% |

The mix calculations may be accomplished using a Computerized Pearson Square.

Example 2

In another example, each batch again may be standardized to the following content values: non-fat, milk solids of about 5.65% (excluding whey protein concentrate-80), butterfat in a range of about 1.8% to about 2%, and total solids in a range of about 8.9% to about 10.5%, by weight. The finished milk product has a target density of about 1.0257 gms/cm$^3$. Consequently, an example of a 3,785.41 liter (1,000 gallon) batch of an HTST pasteurized, unflavored milk product is as follows:

| Component | Kilograms |
|---|---|
| UF Skim Milk | 1,250.06 kg |
| Cream | 161.89 kg |
| Water | 2,397.81 kg |
| Whey Protein Concentrate-80 | 31.97 kg |
| Calcium Caseinate | 31.97 kg |
| CC-323 Calcium Fortifier | 5.82 kg |
| Salt | 2.27 kg |
| Satiagel AMP 270 Carrageenan | 0.78 kg |
| Sucralose | 0.23 kg |
| Potassium Sorbate | 0.78 kg |
| Vitamin D | 0.01 kg |

Salt may be sodium chloride or a reduced sodium, salt substitute, or combinations thereof. After mixing, the milk product is subjected to HTST pasteurization, such as by the HTST processes described above.

Example 3

With respect to the processes described above, the components of the milk product may be mixed in the following order. First, the manufacturer may place a measured amount of UF skim milk into a mix vat. Load cells or liquid metering devices, or both, may be used to ensure accuracy. Second, the manufacturer may meter into the vat the desired amounts of water and cream. Third, the manufacturer then may add pre-weighed powdered (i.e., dry ingredients) through a mixer/blender or a powder horn. While adding these components, the manufacturer endeavors to keep foaming to a minimum. Fourth, the manufacturer may add a pre-measured quantity of liquid sucralose. Fifth, the manufacturer tests the milk product's composition of carbohydrates, lactose, butterfat, protein, non-fat milk solids, and total solids, prior to pasteurization and homogenization.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A process for manufacturing a milk product, comprising the steps of:
   providing ultra filtered skim milk;
   adding water and a fat source to said ultra filtered raw skim milk to obtain a first combination of ultra filtered skim milk, water and a fat source; and
   adding a source of protein to said first combination to form a second combination,
   wherein said first combination comprises a composition of non-fat milk solids of about 5.65% by weight, total solids in a range of about 8.9% to about 10.5% by weight, and butterfat in an amount less than about 3.3% by weight, and further wherein said steps result in a milk product comprising a drinkable beverage having organoleptic qualities similar to those of reduced or low fat milk.

2. The process of claim 1, further comprising the steps of:
   determining a first content of non-fat milk solids by weight, a second content of total solids by weight, and a third content of butter fat by weight of said ultra filtered skim milk; and
   determining a first amount of water and a second amount of a fat source to add to said ultra filtered skim milk to obtain said desired composition of said first combination.

3. The process of claim 1, further comprising the step of adding a predetermined amount of a sweetener to said first combination to form a second combination.

4. The process of claim 3, further comprising the step of determining the content of said second combination.

5. The process of claim 3, further comprising the step of homogenizing said second combination.

6. The process of claim 3, further comprising the step of pasteurizing said second combination.

7. The process of claim 3, wherein said pasteurization step further comprises pasteurizing said second combination by a HTST pasteurization process.

8. The process of claim 3, wherein said pasteurization step further comprises pasteurizuing said second combination by a UHT pasteurization process.

* * * * *

UNITED STATES PATENT AND TRADEMARK OFFICE
CERTIFICATE OF CORRECTION

| | | |
|---|---|---|
| PATENT NO. | : 7,611,742 B2 | Page 1 of 1 |
| APPLICATION NO. | : 10/753766 | |
| DATED | : November 3, 2009 | |
| INVENTOR(S) | : Calvert, Jr. | |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 879 days Delete the phrase "by 879 days" and insert -- by 1011 days --

Signed and Sealed this

Twenty-fourth Day of August, 2010

David J. Kappos
*Director of the United States Patent and Trademark Office*